(12) United States Patent
Mrak et al.

(10) Patent No.: US 11,134,242 B2
(45) Date of Patent: Sep. 28, 2021

(54) ADAPTIVE PREDICTION OF COEFFICIENTS OF A VIDEO BLOCK

(71) Applicant: British Broadcasting Corporation, London (GB)

(72) Inventors: Marta Mrak, London (GB); Ebroul Izquierdo, London (GB); Saverio Giovanni Blasi, London (GB)

(73) Assignee: BRITISH BROADCASTING CORPORATION, London (GB)

(*) Notice: Subject to any disclaimer, the term of this patent is extended or adjusted under 35 U.S.C. 154(b) by 298 days.

(21) Appl. No.: 15/034,057

(22) PCT Filed: Nov. 4, 2014

(86) PCT No.: PCT/EP2014/073712
§ 371 (c)(1),
(2) Date: May 3, 2016

(87) PCT Pub. No.: WO2015/063330
PCT Pub. Date: May 7, 2015

(65) Prior Publication Data
US 2016/0269725 A1    Sep. 15, 2016

(30) Foreign Application Priority Data

Nov. 4, 2013 (GB) .................... 1319493

(51) Int. Cl.
*H04N 19/103* (2014.01)
*H04N 19/18* (2014.01)
*H04N 19/157* (2014.01)
*H04N 19/132* (2014.01)
(Continued)

(52) U.S. Cl.
CPC ......... *H04N 19/103* (2014.11); *H04N 19/124* (2014.11); *H04N 19/132* (2014.11);
(Continued)

(58) Field of Classification Search
CPC combination set(s) only.
See application file for complete search history.

(56) References Cited

U.S. PATENT DOCUMENTS

| 2011/0206135 A1* | 8/2011 | Drugeon | H04N 19/176 375/240.24 |
| 2012/0044990 A1* | 2/2012 | Bivolarsky | H04N 19/105 375/240.03 |

(Continued)

FOREIGN PATENT DOCUMENTS

| EP | 0 831 660 A2 | 3/1998 |
| EP | 1 081 958 A1 | 3/2001 |

(Continued)

OTHER PUBLICATIONS

Motorola Australia Pty Ltd; "Modified MPEG-4 Intra Frame Coding Algorithm for JPEG2000;" ISO/IEC JTC1/SC29/WG1; Joint Photographic Experts Group; Nov. 10-14, 1997; 18 pages.

(Continued)

*Primary Examiner* — Samuel D Fereja
(74) *Attorney, Agent, or Firm* — Daly, Crowley, Mofford & Durkee, LLP (57) ABSTRACT

An efficient high quality video coding and decoding technique is described. A prediction block is generated that contains modified coefficients. The modified coefficients improve the efficiency of the compression process once the prediction block is subtracted from the original block to generate a residual signal for quantisation and encoding. A similar process operates at the decoder side. The processes may operate in both the frequency and the spatial domain.

20 Claims, 8 Drawing Sheets

(51) Int. Cl.
*H04N 19/182* (2014.01)
*H04N 19/124* (2014.01)
*H04N 19/176* (2014.01)
*H04N 19/50* (2014.01)

(52) U.S. Cl.
CPC ......... *H04N 19/157* (2014.11); *H04N 19/176* (2014.11); *H04N 19/18* (2014.11); *H04N 19/182* (2014.11); *H04N 19/50* (2014.11)

(56) References Cited

U.S. PATENT DOCUMENTS

| | | | |
|---|---|---|---|
| 2012/0195379 A1* | 8/2012 | Alshin | H04N 19/895 375/240.12 |
| 2013/0071039 A1* | 3/2013 | Sato | H04N 19/176 382/251 |
| 2013/0101022 A1 | 4/2013 | Amonou et al. | |
| 2013/0208790 A1* | 8/2013 | Davies | H04N 19/61 375/240.03 |
| 2013/0230098 A1* | 9/2013 | Song | H04N 19/18 375/240.03 |

FOREIGN PATENT DOCUMENTS

| | | |
|---|---|---|
| EP | 1 684 524 A1 | 7/2006 |
| JP | WO2013/129203 | 7/2015 |
| WO | WO-2012004616 A1 * | 1/2012 ........... H04N 19/103 |

OTHER PUBLICATIONS

Muzaffar, et al.; "Maximum Video Compression Using AC-Coefficient Prediction;"IEEE TENCON; Proceedings of the IEEE Region 10 Conference; Sep. 15, 1999; 4 pages.
"Text of ISO/IEC 14496-2:2001;" MPEG-4 Visual; 2001 Edition; MPEG Meeting; No. 4350; Jul. 30, 2001; Part 1 of 5; 168 pages.
"Text of ISO/IEC 14496-2:2001;" MPEG-4 Visual; 2001 Edition; MPEG Meeting; No. 4350; Jul. 30, 2001; Part 2 of 5; 84 pages.
"Text of ISO/IEC 14496-2:2001;" MPEG-4 Visual; 2001 Edition; MPEG Meeting; No. 4350; Jul. 30, 2001; Part 3 of 5; 84 pages.
"Text of ISO/IEC 14496-2:2001;" MPEG-4 Visual; 2001 Edition; MPEG Meeting; No. 4350; Jul. 30, 2001; Part 4 of 5; 102 pages.
"Text of ISO/IEC 14496-2:2001;" MPEG-4 Visual; 2001 Edition; MPEG Meeting; No. 4350; Jul. 30, 2001; Part 5 of 5; 102 pages.
Blasi, et al.; "Frequency Domain Intra-Prediction Processing for High Quality Next Generation Video Coding;" IEEE Transactions on Circuits and Systems for Video Technology; vol. 25; Issue 5; May 2015; 12 pages.
Cao, et al.; "Short Distance Intra Coding Scheme for HEVC;" IEEE 2012 Picture Coding Symposium; May 7-9, 2012; pp. 501-504; 4 pages.
PCT Search Report of the ISA for PCT/EP2014/073712 dated Mar. 11, 2015; 4 pages.
PCT Written Opinion of the ISA for PCT/EP2014/073712 dated Mar. 11, 2015; 9 pages.

* cited by examiner

| 64 | 64 | 64 | 64 | 64 | 64 | 64 | 64 |
|---|---|---|---|---|---|---|---|
| 89 | 75 | 50 | 18 | -18 | -50 | -75 | -89 |
| 83 | 36 | -36 | -83 | -83 | -36 | 36 | 83 |
| 75 | -18 | -89 | -50 | 50 | 89 | 18 | -75 |
| 64 | -64 | -64 | 64 | 64 | -64 | -64 | 64 |
| 50 | -89 | 18 | 75 | -75 | -18 | 89 | -50 |
| 36 | -83 | 83 | -36 | -36 | 83 | -83 | 36 |
| 18 | -50 | 75 | -89 | 89 | -75 | 50 | -18 |

| Index | Value |
|---|---|
| 0 | N/A |
| 1 | 1 |
| 2 | -1 |
| 3 | 2 |
| 4 | -2 |
| 5 | 4 |
| 6 | -4 |
| 7 | 8 |
| 8 | -8 |
| 9 | 16 |
| 10 | -16 |
| 11 | 32 |
| 12 | -32 |

| Index | Value |
|---|---|
| 0 | N/A |
| 1 | 15 |
| 2 | 31 |
| 3 | 47 |
| 4 | 64 |
| 5 | 107 |
| 6 | 163 |
| 7 | 191 |
| 8 | 255 |

ADAPTIVE PREDICTION OF COEFFICIENTS OF A VIDEO BLOCK

CROSS REFERENCE TO RELATED APPLICATIONS

This application is a U.S. National Stage of PCT application PCT/EP2014/073712 filed in the English language on Nov. 4, 2014, and entitled "ADAPTIVE PREDICTION OF COEFFICIENTS OF A VIDEO BLOCK," which claims priority to GB application GB1319493.1 filed Nov. 4, 2013. The entire disclosures of both are incorporated by reference herein in their entireties.

The invention relates to an improved compression algorithm for video compression codecs, and in particular to a method, apparatus and computer program for implementing the method.

Known video coding standards are highly efficient when employed in applications where low to medium quality is acceptable, such coding for conventional internet or computer based viewing, and most effort in the video coding community is dedicated to improving the efficiency of video coders at these levels of quality. The H.265/HEVC (High Efficiency Video Coding) standard for example is reported as achieving more than 50% higher efficiency than its predecessor H.264/AVC (Advanced Video Coding) for such applications.

Unfortunately while such levels of quality are acceptable for many purposes, there are many applications where higher levels of quality are necessary. In these cases the decoded video at the receiving end is required to be as faithful to the original video prior to the encoding as possible. Typical examples of such kind of applications can be found in medical imaging applications, in the transmission of signals from cameras throughout the production chain, in-screen mirroring systems (when the content on the screen of a device is mirrored in real-time to a different screen), and so on. Moreover with the increasing diffusion of high-definition televisions capable of handling very high frame rates and of displaying content at high bit depths, the quality of decoded videos is becoming an extremely important issue even in the context of consumer applications. Users want new broadcasting systems to deliver videos as accurately as possible, with the lowest visible errors. Under these quality constraints, the efficiency of HEVC with respect to its predecessor AVC has been found to decrease considerably.

Moreover, conventional prediction methods, used in the above coding standards to provide compression, are based on the minimization of distortion metrics computed in the spatial domain (such as the sum of absolute differences, SAD). Such metrics do not always take into account the accuracy of different prediction modes on the frequency components of the signal.

We have therefore appreciated that it would be desirable to provide an approach for efficient high quality video coding that seeks to address these problems.

SUMMARY OF THE INVENTION

The invention is defined in the independent claims to which reference should now be made. Advantageous features are set forth in the dependent claims.

BRIEF DESCRIPTION OF THE DRAWINGS

Embodiments of the invention will now be described by way of example and with reference to the drawings in which.

DETAILED DESCRIPTION OF THE EXAMPLE EMBODIMENTS

Figure 1:
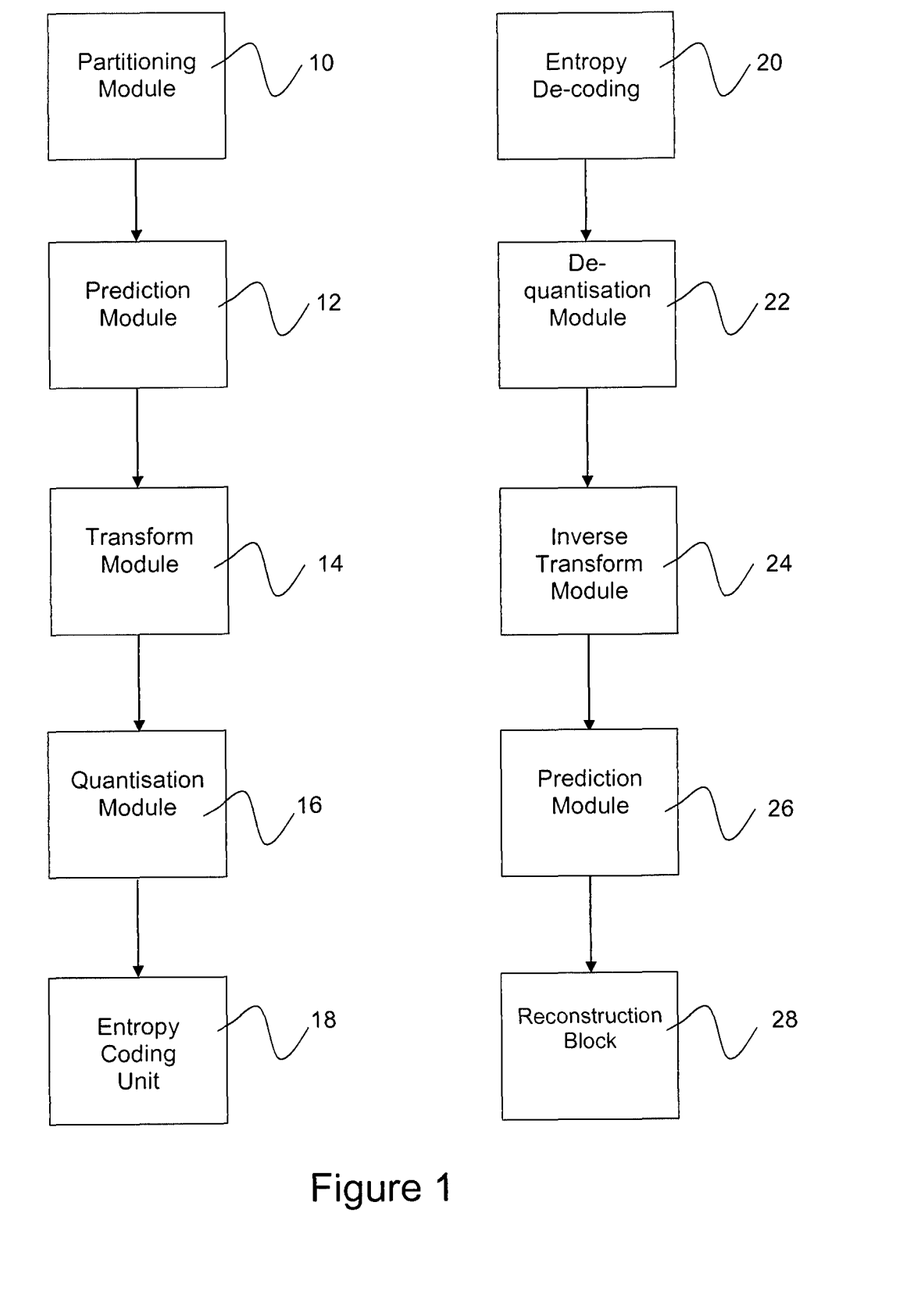
FIG. 1 is a schematic illustration illustrating an encoding and decoding process.
Figure 2:
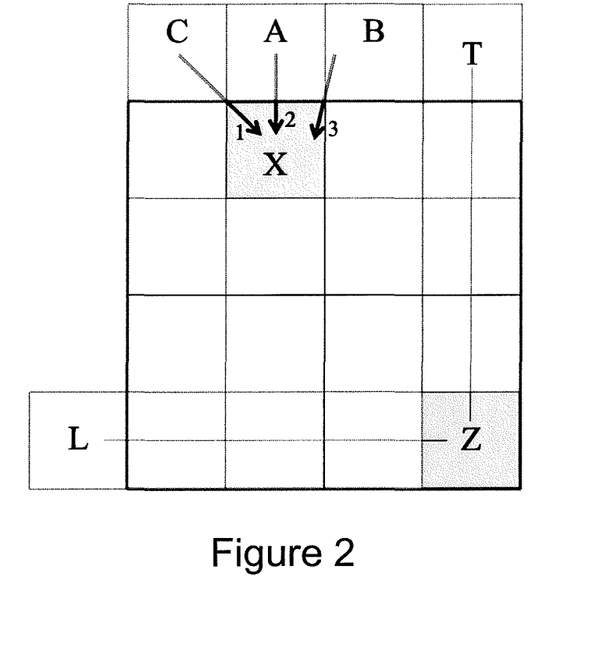
FIG. 2 is a schematic illustration of a intra-angular and intra-planar prediction processes.
Figure 3:
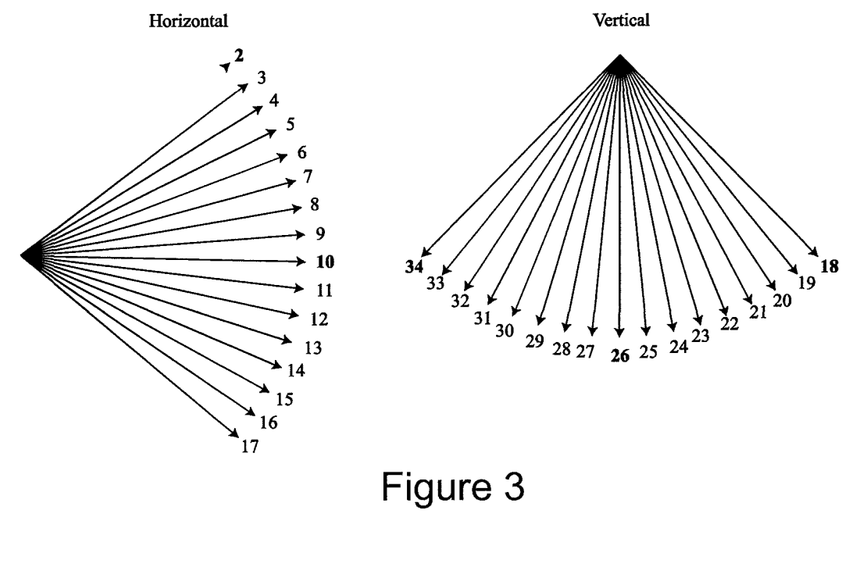
FIG. 3 is an illustration of angular intra prediction modes available in HEVC (modes indicated in bold and dashed arrows are obtained by direct extrapolation, whereas all other modes are obtained by bilinear interpolation)
Figure 4:
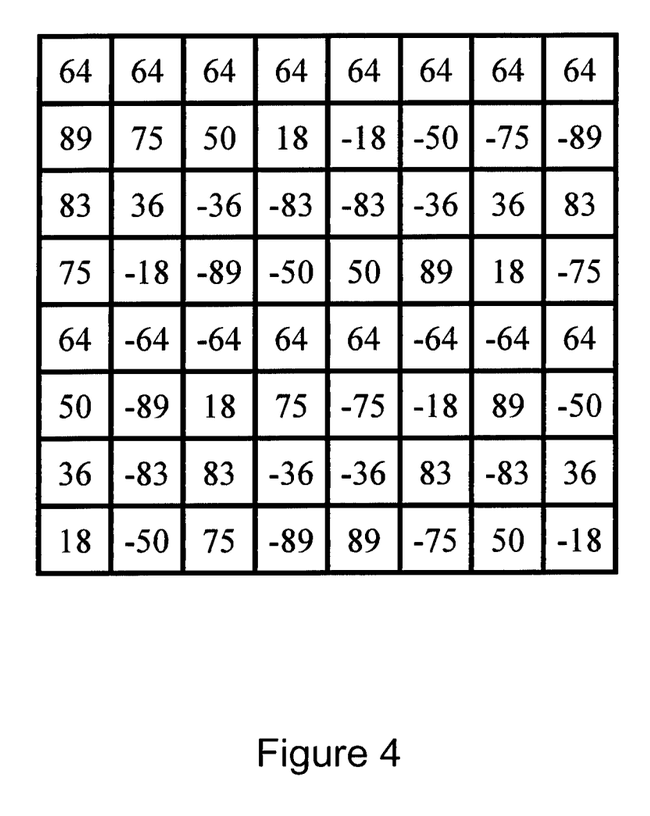
FIG. 4 is an illustration of a transform matrix, where each row represents a transform vector for an 8-point transform.

Most of the video compression standards available today, including HEVC and AVC, follow a block based hybrid scheme involving a number of successive stages. Referring to FIG. 1, the current picture or frame in a sequence of pictures is passed to a partitioning module 10 where it is partitioned into blocks of a given size for sequential processing by the encoder. Each block is then input to a prediction module 12, which seeks to discard temporal and spatial redundancies present in the sequence and obtain a prediction signal using previously coded content. Any information necessary to compute such prediction is encoded in the bit stream. The prediction signal is subtracted from the original signal to obtain a residual signal. This is then input to a transform module 14, which attempts to further reduce spatial redundancies within a block by using a more suitable representation of the data. The resulting signal is then typically quantised by optional quantisation module 16, and finally the resulting data formed of the coefficients and the information necessary to compute the prediction for the current block is input to an entropy coding unit that 18 makes use of statistical redundancy to represent the signal in a compact form by means of short binary codes. FIGS. 2 and 3 illustrate in more detail example prediction techniques that may be used in embodiments of the invention. FIG. 4 illustrates by way of example a base matrix for an 8×8 transform unit.

The decoding process illustrated on the right hand side of FIG. 1 is essentially the reverse process. A received bit stream is decoded in module 20 to obtain a block of coefficients and the information necessary to compute the prediction for the current block. The block of coefficients is de-quantised in dequantisation module 22 and inverse transformed to the spatial domain by transform unit 24. A prediction signal is generated as before, from previously decoded samples from current or previous frames and using the information decoded from the bit stream, by prediction module 26. An original picture block is then reconstructed from the decoded residual signal and the calculated prediction block in the reconstruction block 28.

The prediction module 12 of a video encoder provides the prediction signal for a given block. The way this prediction is computed depends on the current coding conditions, such as the temporal order of the current frame in the sequence or the coding configuration, and is generally based on rate-distortion decisions. There are a number of different ways that the prediction signal may be generated, as is well known in the art.

Two prediction schemes are generally used in modern video coding standards. So called intra-prediction methods make use of content extracted from the same frame as the currently encoded block. Usually only information extracted from samples in the surroundings of the current block being encoded are used to compute the prediction. This kind of prediction is generally useful in the case of high spatial correlation within the current picture, or when the content in the frame is the only available information (e.g. while encoding the first frame in the sequence). Conversely, inter-prediction methods make use of the content of previously encoded frames (such as neighbouring frames in the sequence).

In general the content of these frames can be very similar to the content of the current frame. Most of the encoders available today perform inter-prediction by means of motion estimation and compensation: the current picture block is compared with candidate prediction blocks extracted at certain spatial displacements from a previously encoded reference frame; for each candidate prediction block a distortion value is computed to measure the similarity between the two blocks; finally the candidate at minimum distortion is extracted to form the prediction for the current block. The information needed by the decoder to select and extract the correct prediction is included in the bit stream transmitted from the encoder, referred to as motion information.

Once a prediction is computed for each picture block, this is subtracted from the original data to obtain a residual signal. This residual signal is input to the transform module 14 to obtain a more compact representation. In general this is achieved by transforming the signal to the frequency domain, using a discrete cosine transform (DCT) or other process, to condense most of the information in a small number of coefficients suitable for a compact representation. Quantisation is applied on transform coefficients which reduces their precision to achieve desired high compression. Finally the obtained residual coefficients are entropy coded in the bit stream by Entropy Coding Unit 16.

Conventional intra-prediction methods typically compute the prediction block using a number of spatial samples extracted from the boundaries of the currently encoded picture block. To ensure that the process can be repeated at the decoder side, only samples in blocks that have already been encoded can be used for this purpose. For instance an encoder that processes blocks in raster scan order can only use samples in the top-left portion of the frame.

Several methods can be used to obtain the prediction block. In particular three modes are usually defined at this purpose in recent standards such as AVC or HEVC: angular, DC or planar prediction.

When using angular prediction, samples are extrapolated from data in the boundary according to a certain specified angular direction. Different angular directions can be used to extrapolate samples at the boundary throughout the block. In the case of HEVC up to 33 directions (or modes) can be considered. Each sample is predicted using one or two samples in the boundary by means of linear interpolation, such as in the expression:

$$x = \frac{(32-w)}{32}s_1 + \frac{w}{32}s_2$$

where $s_1$ and $s_2$ are the intensity values of the samples used for the prediction, and w is an integer from 0 to 32 which identifies the prediction direction.

The process of obtaining the angular prediction is illustrated in FIG. 2. Suppose that the encoder is trying to compute the sample in the location denoted as X in the figure. For angular directions between the directions depicted by arrows 1 and 2, X is predicted using the samples located in A and C. The prediction at the direction depicted by arrow 1 (pure diagonal) happens by direct extrapolation of the sample located in C, or w=0 in the above expression; similarly the prediction at the direction depicted by arrow 2 (pure vertical) happens by direct extrapolation of the sample located in A, or w=32 in the above expression. Conversely in the case of the angular direction depicted by arrow 3, the samples located in A and B are used for the prediction; a weight w=8 is used to obtain the predicted sample.

All angular intra-prediction modes available in HEVC are illustrated in FIG. 3, using the same nomenclature as in the standard. The directions indicated in bold indicate the modes that are obtained by means of direct extrapolation (such as pure vertical, pure horizontal, or pure diagonal).

The DC intra-prediction mode (referred to as mode 1 in HEVC) consists in predicting all samples in the prediction block using the same value, usually obtained by averaging a number of samples extracted from the boundary. This mode is suitable to predict very smooth areas of static content in the frame, but fails in providing a good prediction on content presenting higher frequency components.

For this reason, planar intra-prediction mode can be used. It has already been introduced in the AVC standard and is also used in HEVC. Planar prediction is based on successive interpolations of samples. The version currently implemented in the HEVC standard (referred to as mode 0) can be summarised as follows, again with the help of FIG. 2. First the sample in location Z (at the bottom-right position in the block) is predicted as the arithmetic average of the sample in L (extracted from the boundary in the top-right location), and in T (extracted from the boundary in the bottom-left location). Then the right-most column and bottom-most row are predicted using bilinear interpolation between samples in T and Z, or in L and Z respectively. All other samples are predicted by means of bilinear interpolation using a combination of previously predicted samples and boundary samples.

Due to the fact that a relatively large number of samples is predicted using a small amount of information strongly localized on a particular area in the frame, conventional intra-prediction methods might introduce unwanted prediction artefacts and in general might not provide sufficiently accurate predictions. In the case of angular prediction this is mostly evident when using modes with a strong directionality, such as pure vertical or pure horizontal modes. Consider for instance the case of a block predicted by means of pure horizontal mode: the entire data is predicted using exclusively the information in the samples in the column immediately to the left of the block. The original samples, particularly those in locations close to the right edge of the block, might be very different from these predicted samples, resulting in considerably high residuals localized in a particular area in the predicted block.

High residuals cannot be efficiently compressed and an attempt to reduce related bitrates typically results in blocking artifacts in the decoded frames. Other types of intra-prediction modes (such as DC prediction) also might produce similar artefacts.

For this reason most recent intra-prediction algorithms typically include a filtering algorithm usually applied to the samples in the boundary prior to performing intra-prediction. In particular HEVC makes use of a smoothing filter, consisting of a gradient-based smoothing (for vertical or horizontal prediction) or a two-tap filtering (for DC prediction).

When the smoothing filter is disabled, errors in the residual signal tend to be distributed towards the right edge of the block, while a more uniform distribution of the error is obtained when the smoothing filter is enabled. While the smoothing filters help in distributing the residual error throughout the block, it does not decrease the energy of such residuals. In fact relatively high residuals can be expected as a result of conventional intra-prediction methods even when using such filters. This is especially problematic when targeting high quality applications where such information cannot be discarded but needs to be compressed and encoded.

With reference to FIG. 4, the concept of transform encoding will now be discussed. The main idea behind transform coding is that of compacting the information in the signal in a smaller number of parameters by transforming it to the frequency domain. Ideally the transform should be able to decorrelate the signal as much as possible, obtaining a representation that is optimal for the purpose of data compression.

A common way of obtaining such representation for image and video coding methods is by means of the two-dimensional DCT. When using DCT, each block of N×N pixel intensities is expressed as a weighted sum of $N^2$ scaled cosinusoids of different amplitudes and frequencies, referred to as the DCT basis functions. The weights that must be applied to each basis function in order to return exactly the original signal are referred to as the transformed coefficients.

Consider a certain N×N block of samples X and referring to each sample as x(i, j). The DCT-II is defined as:

$$x(i, j) = \sum_{m=0}^{N} \sum_{n=0}^{N} k_{m,n} X(m, n) \cos\frac{\pi(2i+1)m}{2N} \cos\frac{\pi(2j+1)n}{2N} \quad [1]$$

where the $k_{m,n}$ are predetermined scaling factors and the X(m, n) are the transformed coefficients. When m=0 and n=0 the frequency of the two cosines in the function becomes zero and the corresponding basis function reduces to a constant; such frequency component is referred to as the DC component, and the associated weight X(0, 0) at the top-right location in the transformed block is referred to as the DC coefficient. Each following value of m and n corresponds to a higher frequency component AC(m, n), as illustrated in FIG. 4. Each transformed coefficient X(m, n) can be determined in terms of an inverse expression as a function of the original elements x(i, j). As a result, each block of N×N samples in the spatial domain is exactly represented by its corresponding block of N×N coefficients in the frequency domain.

Both computations of the forward DCT transform (to obtain the transformed coefficients) and inverse DCT transform (to compute the original samples) can be compacted in the form of simple matrix multiplications following from the definition of an appropriate N×N matrix Q, referred to as the transform base matrix. The elements of Q are then defined as:

$$q(m, n) = k_{m,n} \cos\frac{\pi(2m+1)n}{2N} \quad [2]$$

Due to the orthogonality of Q its inverse is the same as its transpose, and the forward and inverse DCT transforms can be expressed as:

$$\bar{X} = QXQ^T \quad [3]$$

and $$X = Q^T\bar{X}Q \quad [4]$$

In practical applications, due to the limited availability of resources, the elements in the base matrices used to compute the transform are obtained by means of rounded integer approximations of the values obtained using Equation 2 above. Also, the transform coding is most effective in blocks that contain a relatively small amount of texture changes. In these cases the majority of coefficients at higher frequencies would be equal or close to zero while most of the signal would be compacted in a few coefficients at lower frequencies. It is therefore crucial that a frame is partitioned into blocks specifically for transform coding in the most efficient possible way. In the case of HEVC, a recursive approach is used for this purpose in which square blocks of different sizes are considered, referred to as transform units (TU).

A single base matrix $Q_{32}$ is defined for the largest allowed TU size (set at 32×32 pixels), obtained by appropriately rounding to integer approximations the values in Equation. 2. The base matrices for smaller TU sizes are obtained by downsampling this largest base matrix. The matrix $Q_8$ used for 8×8 TUs is illustrated in FIG. 4.

The DCT has many desirable characteristics (such as ease of computation and very good performances for inter-predicted blocks), but it is not the optimal choice to decorrelate the residual signal especially in the case of intra-predicted blocks. This is due to the fact that its cosinusoidal basis functions are bad approximations of the behavior of the residual signal. Consider for instance the case of angular prediction. Samples in locations closer to the top or left boundaries are likely to be predicted more accurately than samples close to the bottom right corner of the block. Consequently, the residuals are likely to assume smaller values along the top row and right column in the block, and progressively larger values towards the left and bottom edges of the block.

A better decorrelation of the residual signal in intrapre-dicted blocks can be obtained by means of a discrete sine transform (DST) with appropriate frequency and phase components. DST was implemented already in selected intraprediction modes in AVC and is also used in HEVC for small 4×4 intra-predicted TUs. It is not used for larger blocks due to its generally higher computational complexity and the lack of fast algorithms for computing the transformed coefficients.

A detailed study on the optimality of different transforms in the case of HEVC angular intra-prediction has found that there exists a strong correlation between the optimal transform to be used (in either the horizontal or vertical steps), and the angular direction of the prediction. Similarly, another study on the optimality of the DCT transform making use of Gaussian Markov random field models concluded that DCT is indeed not optimal for intra-predicted residual signals.

Transform is followed by quantization. Each coefficient is quantized to a given step (depending on a parameter usually referred to as the quantization parameter, QP). The higher the QP, the coarser is the quantization. Coefficients that are closer to zero, usually corresponding to the higher frequency components, are completely discarded.

Figure 5:
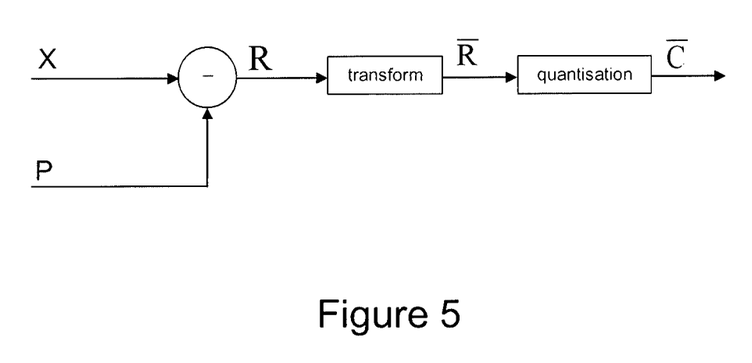
FIG. 5 is a schematic illustration of a known encoder.

The above discussion illustrates the processes of partitioning, prediction and transforming blocks of picture data. FIG. 5 illustrates how the processes are put together in a more mathematical sense in a known encoder. Consider that a certain N×N square block of original samples X is being encoded. Consider also that an equally sized block of samples P is being considered as a predictor or prediction block for X, obtained from one of the possible intra-prediction modes. We denote as Q the N×N transform base matrix. Typically in video coding standards this corresponds to an appropriately sized N-point DCT or DST transform matrix. In known video codecs the residual samples are then computed in the spatial domain as R=X−P, and are then transformed to the frequency domain as $\bar{R}=QRQ^T$. These steps are illustrated in the scheme in FIG. 5.

Figure 6:
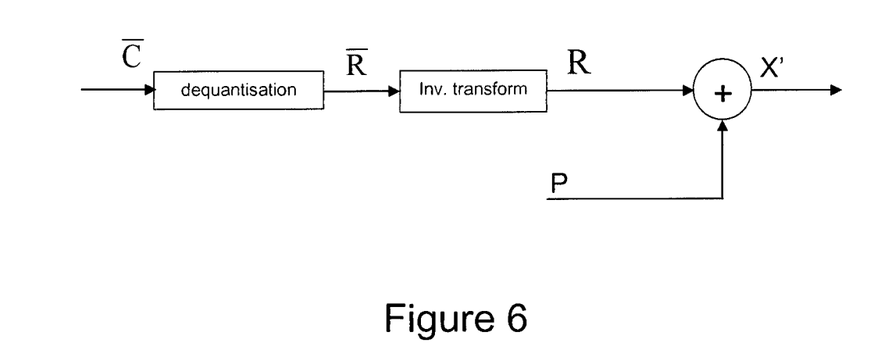
FIG. 6 is a schematic illustration of a known decoder.

Similarly at the decoder side in known video codecs, the coded coefficients C that are extracted from the bitstream are dequantised to give a residual signal $\bar{R}$, which is then inverse transformed into the spatial domain into the signal R, before being added to the prediction block P. This process is illustrated in FIG. 6.

Figure 7:
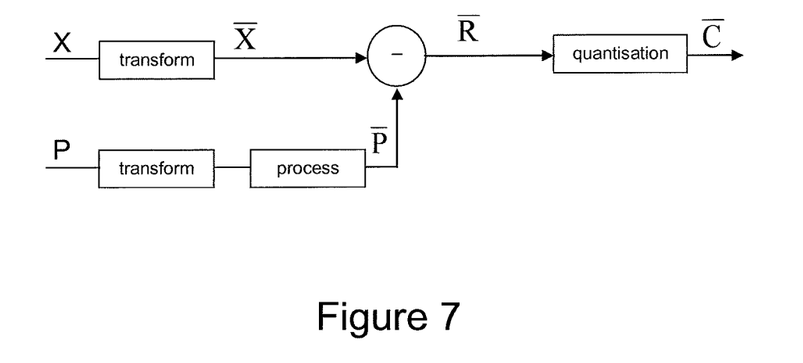
FIG. 7 is a schematic illustration of a modified encoder according to a first example of the invention.

In one example embodiment of the invention, we have appreciated that it would be advantageous to also process the prediction block and the original block in the frequency domain, and in addition the residual signal. At the encoder side the predictors and original signals are directly transformed to the frequency domain before the residual is calculated. The residual signal is then computed in the frequency domain as the difference between the transformed original and prediction signals. This is illustrated in FIG. 7.

Figure 8:
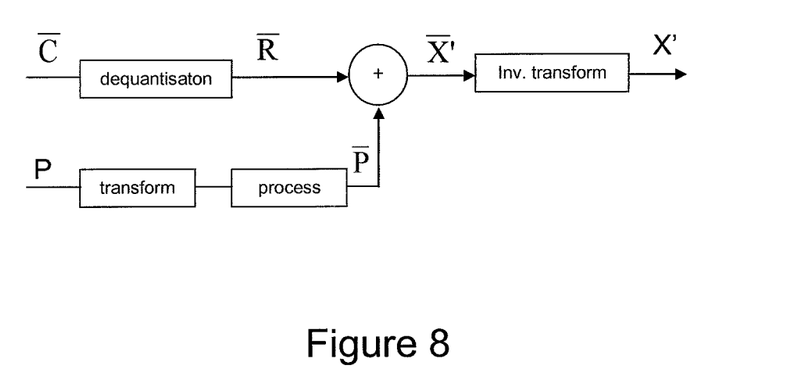
FIG. 8 is a schematic illustration of a modified decoder according to a first example of the invention.

At the decoder on the other hand, in one example embodiment of the invention, the prediction samples are transformed to the frequency domain, added to the dequantised coefficients, and finally the reconstructed samples are inverse transformed as in FIG. 8. Operating in the frequency domain allows the example embodiment of the invention to more easily manipulate the frequency coefficients prior to encoding in a way that provides advantages over the prior art. This will be discussed in more detail below.

Otherwise, the frequency domain operation can be understood to be largely equivalent to the spatial domain operation of the prior art. If the same X and P are used as input to the two encoding schemes of FIGS. 5 and 7, the same residual signal should be obtained in the frequency domain. In practice, it is not always identical due to limits on computing resources. The linearity of the transform however can be easily demonstrated by noticing that transforming the original picture block X as in the scheme in (b) results in a block of coefficients $\bar{X}=QXQ^T$. Equivalently the prediction P can be transformed in $\bar{P}$. Finally the residuals are directly computed in the frequency domain as:

$$\bar{R} = \bar{X} - \bar{P} = QXQ^T - QPQ^T$$
$$= Q(X-P)Q^T = QRQ^T$$

demonstrating the equivalence.

In practical applications, due to the integer approximations and limitations on the coefficient buffer size, the transforms are not linear. Variables during the stages of transform computation might be truncated to limited precisions. For this reason the two schemes of FIGS. 5 and 7 (ignoring the process block) can result in slightly different transformed residuals. In the case of HEVC, and denoting with the letter B the input/output bitdepth of the representation, and with N the width or height of the current blocks, the first (horizontal) stage of DCT transform in FIG. 7 may be followed by a binary shift of:

$$S_{hor}=\log 2(N)-1+(B-8)$$

The shifts needed in HEVC in the case of DCT for 8-bit input data are shown in Table I, for the two stages of transform.

The example embodiment of the invention seeks to provide a more efficient prediction block for the encoding process as will be described below. In general by providing a more accurate prediction of the current block, a better encoder performance can be expected (due to the smaller residual samples which require less bits to be coded). While common distortion metrics in the spatial domain such as the sum of squared differences (SSD) can be used to estimate the accuracy of a prediction, these types of metrics can fail in measuring the impact of prediction methods on the residual coefficients at different frequency components. It is instead reasonable to expect particular effects of certain prediction modes on specific frequency components of the residual signal. These effects might be captured and analysed to formulate appropriate processing methods to improve the coding efficiency.

An effective measure of the similarity between prediction and original blocks in the frequency domain can be obtained by means of the per-coefficient correlation. This is the normalized cross-correlation between the time series of prediction coefficients and corresponding original coefficients at each specific location in the block. To estimate these correlations, the approach was implemented in the context of HEVC intraprediction and a few sequences were encoded to collect test data.

The normalized cross-correlation can be defined as:

$$R_{N,s}[\bar{p}[m,n],\bar{x}[m,n]] =$$

$$R_{N,s}[m,n] == \frac{\left[\sum_{i=0}^{K_{N,s}-1} \frac{(\bar{p}_i[m,n]-E\{\bar{p}[m,n]\})(\bar{x}_i[m,n]-E\{\bar{x}[m,n]\})}{\sigma_{\bar{p}[m,n]}\sigma_{\bar{x}[m,n]}}\right]}{K_{N,s}}$$

where the expected values E{•} and standard deviations σ are estimated from the samples. $K_{N,s}$ denotes the number of N×N blocks tested using the intra-prediction mode s, the two time series of prediction and original coefficients are referred to as $\bar{p}[m,n]$ and $\bar{x}[m,n]$ respectively; namely the elements $\bar{p}_i[m,n]$ for i=0, . . . , ($K_{N,s}$−1) are the prediction coefficients extracted at location [m, n] from all the N×N blocks predicted using the intra-prediction mode s, and similarly $\bar{x}_i[m, n]$ are the original coefficients at the same location.

Values of $R_{N,s}[m\ n]$ close to +1 indicate that the intra-prediction mode s is good at predicting the coefficient located in [m, n] when the TU size is N×N. Values of the cross-correlation close to zero indicate instead that the predicted samples in [m, n] carry almost no information on the original samples.

The correlation results for TUs of different sizes (4×4, 8×8 and 16×16) are shown in Tables 2 for the planar intra-prediction mode; We have found that the TU size has a strong impact on the correlation values especially at higher frequencies (i.e. towards the bottom-right corner of the blocks). Relatively high correlation values are reported in 4×4 blocks at all locations (minimum correlation of 0.3), whereas very low correlation values were found in larger block sizes, showing that the prediction coefficients at these locations carry almost no information about the original coefficients. Similarly the correlation values are strongly influenced by the intra-prediction mode, as illustrated in Table 3. The correlation values for three angular modes are shown in the case of 8×8 blocks. Notice in particular that pure horizontal angular prediction (corresponding to s=10) results in high correlations in the left region of the block, and very low correlation values elsewhere; similarly pure vertical angular prediction (s=26) results in high correlations in the top region, and very low values elsewhere.

Conventional video coding architectures such as those illustrated in FIGS. 5 and 6 do not take into consideration these effects. By computing independently the transform of the prediction and original blocks, however, the approach taken in the example embodiment of the invention allows instead the encoder to appropriately filter and replace selected frequency components of the prediction, as will now be illustrated.

The correlation analysis performed using the HEVC codec and described above shows that in many cases the prediction coefficients obtained by conventional intra-prediction methods carry very little information on the original coefficients.

This seems to be less evident for small transform sizes (such as 4×4 TUs in HEVC), which generally resulted in higher correlation values less influenced by the prediction mode. The values of the correlation reported for blocks equal or larger than 8×8 show instead a clear relationship with the intra-prediction mode being used, especially in the case of angular direction where they closely follow the angle of prediction. In the frequency domain this results in high correlation values between the prediction and original coefficients in the first column, in slightly lower values in the next column, and very low values elsewhere.

In the example embodiment of the invention, therefore the prediction coefficients in the locations with very low correlation with the original signal are discarded and replaced with more informative content generated by applying a number of value substitution processes. Some high frequency components can therefore be removed from the residual signal providing higher compression efficiency.

The process of selecting particular coefficients in the transformed block is easily formalised through the definition of a set of masking matrices, referred to as masks or patterns. Each mask is a matrix of binary elements that can be applied to a block of coefficients; the value of a binary element in a certain location determines whether the corresponding coefficient in the block is preserved or discarded. To illustrate and validate the method the approach was implemented again in the context of the HEVC codec, but the method can be implemented in any video codec making use of block-based hybrid scheme.

We refer again to each element in the transformed prediction block as $\bar{p}[m,n]$, and assume a TU size of N×N. We then assume that the coefficients that are discarded are replaced with known values r[m, n] (the process of obtaining such values will be discussed below). Lastly, we define also a mask size L, where L is an integer such that 0<=L<=N. Although more complex options are possible, only four classes of pattern will be described here.

1) Vertical rectangular patterns, referred to as vr, consisting of L consecutive rows of preserved coefficients at the top of the pattern.

2) Horizontal rectangular patterns, referred to as hr, consisting of L consecutive columns of preserved coefficients in the left region of the pattern.

3) square patterns, referred to as sq, consisting of L×L preserved coefficients in the top-left corner of the pattern.

4) Triangular patterns, referred to as tr and consisting of a region of preserved coefficients at the top-left of the pattern.

Figure 9:
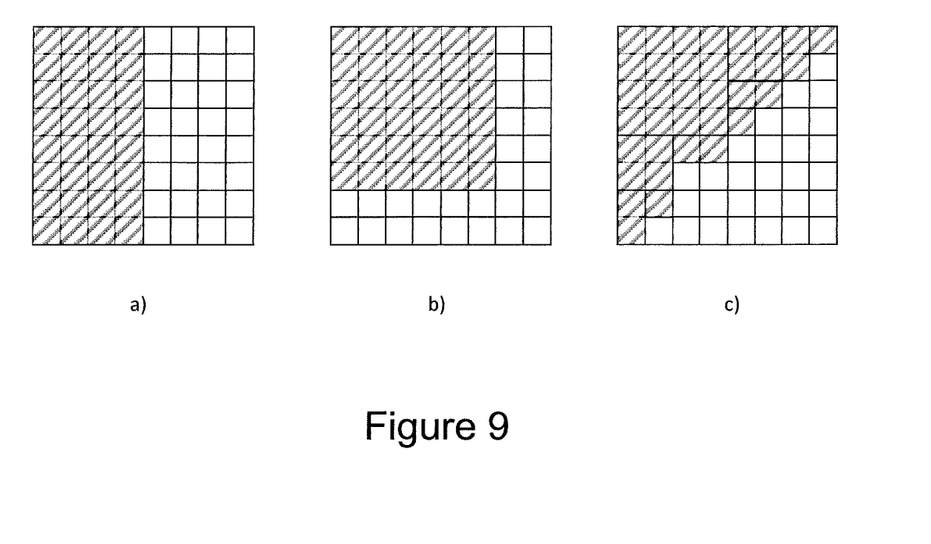
FIG. 9 is an illustration of different substitution patterns that can be applied to the prediction block in a first example of the invention.

Three values of L are considered for illustration for the classes vr, hr and sq, specifically L=N/4, L=N/2 and L=3N/4 although many values are possible. These are illustrated in FIG. 9, as masks a, b, and c. The size of the mask within the block can be varied as appropriate. Also, it will be appreciated that other shapes may be possible, depending on the coding circumstances. The masks shown in FIG. 9 should therefore be taken as illustrations only. In FIG. 9, the shaded areas correspond to a first region of the prediction block in which the prediction coefficients are left unchanged. The white, or unshaded areas, correspond to a second region of the prediction block in which the prediction coefficients are substituted or replaced.

We have found that particular masks or patterns work consistently well with particular prediction modes, and prediction mode angular directions. In order to determine which patterns produce the best results for a respective intra-prediction mode, the method was first implemented assuming that all the elements in the prediction block that are discarded are replaced with zero-valued coefficients, or, r[m, n]=0 in expressions 1 to 4 above. Following from the previous results the method is used on TUs larger or equal than 8×8, with 4×4 TUs being conventionally coded. Each prediction block in the transform domain is processed using a certain pattern. The processed transformed prediction block is then compared with the transformed original block. In particular, a distortion measure is computed, such as the sum of squared differences (SSD), or the sum of absolute differences (SAD). Other techniques may be used as will be known to those skilled in the art. This is repeated for all available patterns. The pattern that results in the lowest distortion is selected as the optimal pattern and used to process the current TU. In a first embodiment, once the encoder determines the optimal mask or pattern for a particular size of transform unit, the encoder continues to select this pattern when ever a transform unit of that size is encountered. This technique results in an improvement in encoding efficiency, and means that there is no need to continuously signal to the decoder which masks or patterns are used. Either the encoder can signal the preferred masks or patterns to the decoder once it has performed its initial analysis, and the decoder can store the required information for prediction block processing, or the decoder can also perform the same analysis as the encoder and store the results for future use.

For example, the method was tested on a few sequences (encoded at very high quality, QP=5), with the results illustrated in Table 4. The table reports the most frequently selected patterns, according to the TU size and intra-prediction mode being used. For most cases, patterns with a very high number of discarded coefficients (for instance with L=N/4) were selected, especially for large 32×32 TUs. Also, as expected, patterns in the hr class were mostly selected in angular horizontal modes, and conversely patterns in the vr class were mostly selected in vertical angular modes. The square pattern with L=N/4 was often selected regardless of the directionality of the prediction. The triangular pattern was mostly chosen when using planar mode, and rarely selected otherwise.

While the previous results are useful to determine a relationship between the characteristics of a certain TU and the best pattern that can be used to process the prediction coefficients, zeroing-out the prediction coefficients is not expected to be an optimal choice in terms of compression efficiency of the proposed method. Although, it may still be used to provide improvements in performance. In the example embodiment of the invention, selected frequency components of the prediction signal are therefore replaced with coefficients that are more correlated with the corresponding components in the original signal.

Depending on the type of data in the original blocks, the original signal can contain large amount of details or textured areas, resulting in many non-zero components at high frequencies. On the other hand typical conventional intra-prediction modes result in many zero-valued components at high frequencies (for example, the DC prediction mode returns a single non-zero coefficient, and similarly pure horizontal or vertical angular predictions return a single column or row of non-zero valued coefficients), and consequently high frequency components are often left in the residual signal. These sparse non-zero residual coefficients at high frequencies are extremely expensive to encode using conventional entropy coding methods. When targeting medium quality applications such coefficients are quantised and discarded, but in the case of high quality video coding this is not allowed. Higher coding efficiency is therefore achieved by removing these coefficients from the residual signal prior to quantization.

A very good prediction can be obtained in the transformed domain using the best mask or pattern for each particular block, and replacing the coefficients that are discarded with values that are as close as possible to those in the same locations in the original transformed block. The use of a mask or pattern and/or the appropriate substitution of coefficients in a region of the prediction block not covered by the mask will be generally termed a modification process. The encoder according to the example embodiment of the invention may be implemented to test all possible candidates of modification process (varying both masks and coefficient substitution) for a particular transformed prediction block and select the optimal candidate. In practice, however, allowing both the choice of the pattern and the values to be used in place of the discarded coefficients can lead to delays in encoding, and might not result in efficient compression due to the large amount of information that would need to be processed and transmitted for each block.

For this reason, in a first example embodiment of the invention, the pattern to use on a block is not transmitted, but is instead fixed depending on characteristics of the block such as size and intra-prediction mode. The encoder and the decoder may then simply look up the appropriate mask to use according to the coding circumstances using identical look up tables.

The choice of values to use for r[m, n] in expressions 4 to 7 is therefore important and in a more complex embodiment of the invention can be optimised for a given mask or pattern. Ideally, the choice of values to use in the coefficient substitution process should require as few bits as possible to be signalled in the bitstream, and at the same time they should be able to predict the high frequency components in the original block in order to remove such components from the residual signal. We have found that both of these requirements can be satisfied replacing selected components with a constant single values.

In a second example embodiment of the invention these values are extracted from a look-up table that has been generated to contain suitable candidate values. By keeping the number of elements in the look-up tables as low as possible, very few bits are needed to extract the correct element for each block. At the same time testing several candidates for the values of r[m, n] allow the encoder to flexibly choose the candidate that better predicts the original signal in each particular case. While the proposed method can be used in any video codec making use of the block-based hybrid approach, testing and validation of the approach was obtained again implementing the method on top of conventional HEVC. In particular, the patterns in Table 4 (i.e. the most frequently selected patterns obtained when zeroing-out components) are used on a TU depending on its size and intra-prediction mode. The elements in the look-up tables were similarly derived following from extensive empirical analysis.

In a simple example, a look up table was generated with all possible candidate values that could be employed, for example, positive and negative integers ranging from 0 to 64. These look-up tables were then tested against actual TUs and masks and filtered to remove candidate values that were rarely found to give the optimal coding. In most cases, a look up table containing between 8 and 16 values was found to be more than sufficient to provide suitable candidate values. An example look up table is included as FIG. 10 for illustration. It will be appreciated that the look up table is merely one way of retaining for a given prediction mode and TU size a set of candidate values for coefficient substitution. Other ways are performing coefficient substitution are possible. For instance, instead of using a fixed set of constant values, in an alternative embodiment, we might formulate and compute a fixed set of matrices of values. These matrices would be formed of pre-computed, coefficients which replace the existing coefficients in the prediction signal. Consider for instance the case in which we are coding a 8×8 block of samples, and using a pattern such as horizontal rectangular with size half. The area that we modified is formed of 4×8 samples. In this case we might produce a set of pre-computed 4×8 matrices. Each would be associated to an index as in a look-up table. The encoder would test all the available matrices before selecting the optimal one. The corresponding index would be transmitted to the decoder. The set of matrices should be made available at both the encoder and decoder side.

Figure 10:
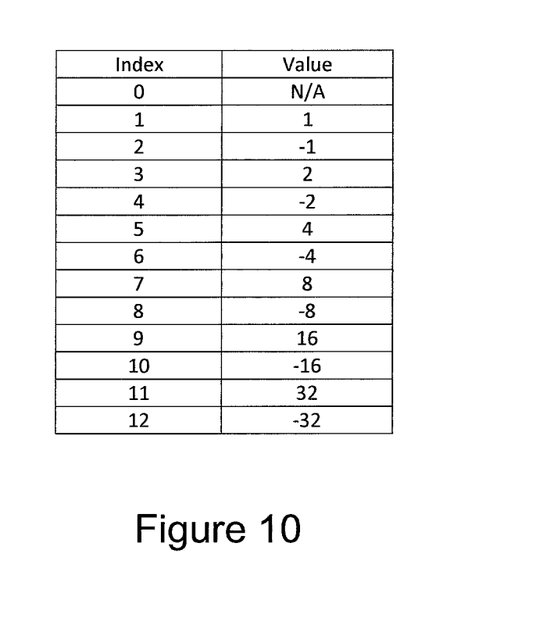
FIG. 10 is an illustration of a look up table used in a coefficient substitution process.

Other more complex substitutions can be formulated. In FIG. 10, a default substitution of a zero value may be used, requiring no additional information to be transmitted in the bit stream.

Different look-up tables are therefore derived and used depending on TU size and intra-prediction mode. The number of elements in the tables depends on the TU size, with fewer values allowed for tables used in case of 8×8 TUs, and increasingly more values in tables used for larger transform sizes. Once derived, such tables are then made available at both the encoder and decoder side.

Although in the first example embodiment of the invention, the encoder does not need to transmit information to the decoder specifying which mask or patterns and/or which substitution technique for the prediction coefficients are used, in more complex embodiments the encoder may calculate for every individual transform unit partitioned from an original block, the optimal mask or pattern, and the optimal coefficient values for substitution. In this case, it is useful if the encoder calculates the cost of transmitting the necessary information to the decoder to indicate which pattern or mask, and/or which coefficient substitution technique was selected, and factor this into its selection decision.

For example, any information transmitted to the decoder to indicate the selected compression scheme will count as extra transmission overhead and so will impact the amount of picture data that can be transmitted and/or the quality of the transmitted data. As noted above, this means that it is preferable to carefully manage the number of variables involved in the modification process and where possible keep these to an optimal, minimal number. In more complex embodiments of the invention, it is therefore desirable to factor in the cost of transmitting the data describing the modification process when calculating which mask or pattern, and/or coefficient substitution process is to be used. In this regard, rather than just selecting the best pattern or mask based on the distortion error, such as the sum of square differences (SSD), the sum of absolute differences (SAD), or the normalised cross-correlation, the encoder may use a rate distortion optimisation technique to determine which modification process and signalling scheme to indicate the selected modification process is optimal.

Rate distortion techniques combine a distortion metric, such as SSD, SAD or normalised cross-correlation, with an estimated bitrate necessary to signal to the decoder the required information to described the modification process. Estimates can be produced by way of known fast estimation methods which return a figure for the number of bits needed to encode the index associated with the current pattern, or alternately, the encoder could in fact perform the actual coding method it would use to transmit the picture information and signalling information to the decoder, and then feedback the exact number of bits required to the decision process. The optimisation is then carried out using a lagragian multiplier and approximated lagrangian optimisation methods for the expression:

Rate Distortion Cost(*RD* Cost)=Distortion+λ(Estimated Bit rate)

The encoder would compute the RD cost for each modification process extracted from the list of considered patterns, and select the pattern at minimum cost.

Thus in an encoder according to a further example embodiment of the invention, each TU is encoded using the proposed method and testing all of the elements in the appropriate look-up table. The same TU is also encoded using conventional HEVC, and finally the best solution in a RD sense is selected and signalled in the bitstream. The algorithm can be summarised as follows.

1) Conventional HEVC coding is performed: the residuals are computed in the spatial domain, transformed and quantised, and entropy coded; the reconstruction block is computed using the inverse process and compared with the original block to obtain a distortion. The RD cost is computed for this solution and used as the current minimum cost. conventional HEVC is considered as the temporary optimal solution.

2) Prediction and original blocks are independently transformed (using adjusted binary shifts). A specific pattern and look-up table are considered according to current TU size and intra-prediction mode. The first element in the look-up table is extracted.

3) The prediction block is processed using the selected pattern and current element in the look-up table. The residual signal is computed in the frequency domain, and the coefficients are successively quantised and entropy coded. An index to signal the current element in the look-up table is also entropy coded in the bitstream The reconstruction block is computed using the inverse process and compared with the original block to obtain a distortion. The RD cost is computed for this solution.

4) The RD cost is compared with the current minimum cost. If the RD cost is lower than the current minimum cost, this becomes the new minimum, and correspondingly the temporary optimal solution is updated to the current solution. If there are elements left in the lookup table, the next element is extracted and step 3 is repeated.

5) Otherwise if there are no other elements in the look-up table the algorithm outputs the optimal solution for the current TU and exits.

A novel approach for efficiently coding video sequences in high quality conditions has therefore been presented based on frequency domain prediction methods. Conventional intra-prediction techniques often fail in providing good prediction of the original signal, especially at higher frequencies and when using large transform sizes. For high quality applications it is crucial that these high frequency components are not quantised and discarded, and for this reason conventional video coding methods result in very high bitrates. The proposed method allows instead to adaptively replace the high frequency components in the prediction signal, possibly resulting in smaller residual coefficients without any loss of data.

In order to do so, the approach is based on a modified encoder scheme where original and prediction signal are independently transformed to the frequency domain; this is opposite to conventional schemes where the residual block is computed in the spatial domain and successively transformed. The proposed encoder scheme allows for an additional stage of processing, introduced at the encoder side after the prediction is transformed, and prior to the residual calculation. The processing is based on a set of masking patterns applied to the transformed prediction block. Each pattern identifies which coefficients in the prediction signal are discarded, and which coefficients are instead preserved. Coefficients that are discarded are replaced with constant values extracted from lookup tables, appropriately derived depending on the transform size and intra-prediction mode.

The approach is shown achieving consistent gains against conventional HEVC under high quality conditions. Up to −4.6% BD-rate reductions are achieved in the all-intra profile, with up to −4.3% reductions achieved in the low delay profile.

Moreover, while the approach is considerably more complex than conventional methods at the encoder side, it has a very little impact on the decoding complexity.

Although the above description assumes that the prediction block and the original block are transformed to the frequency domain before modifying the prediction block and calculating the residual signal, it is also possible to apply the technique of simplifying the prediction block, using a mask or pattern, in the spatial domain.

Figure 11:
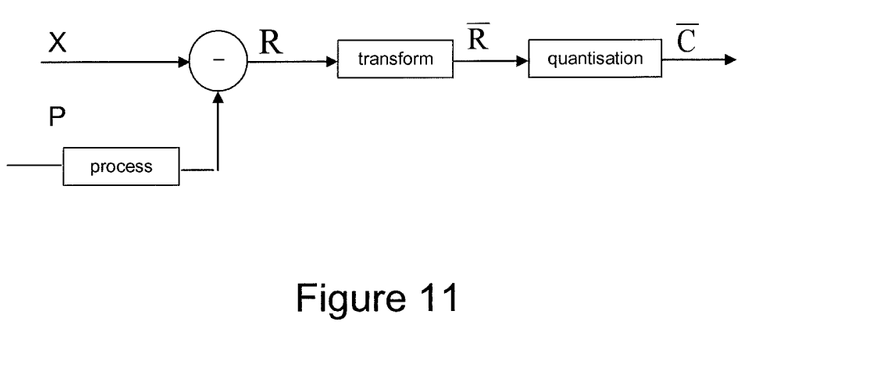
FIG. 11 is a schematic illustration of a modified encoder according to a further example of the invention.
Figure 12:
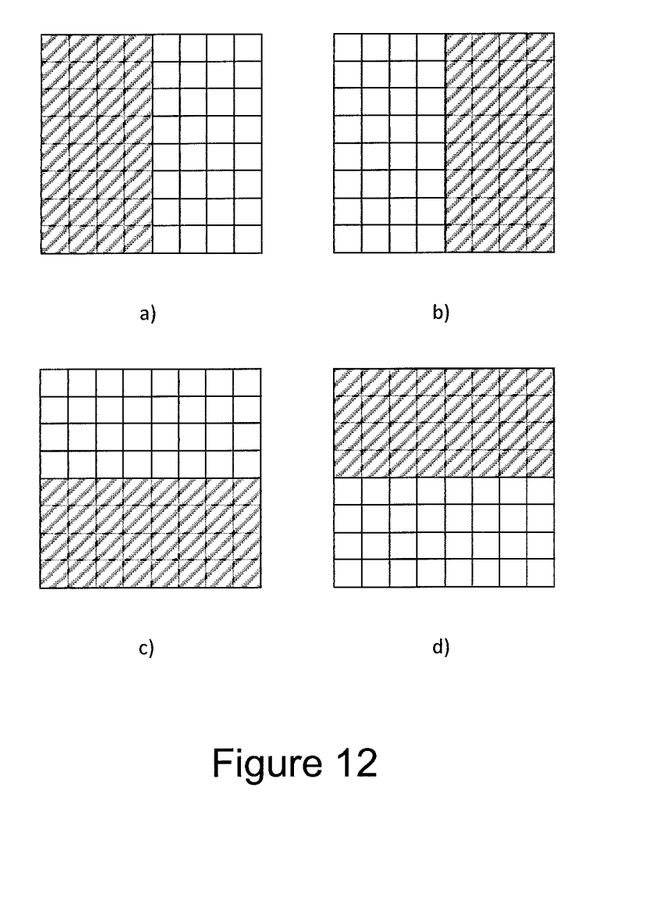
FIG. 12 is an illustration of different substitution patterns that can be applied to the prediction block in a further example of the invention.

For example, referring now to FIG. 11, a scheme in which the processing of the prediction block is carried out in the spatial domain will now be described. FIG. 11 illustrates the process of calculating the residual signal, transforming this, and quantising this for transmission in a bit stream. The arrangement is identical to the prior art situation of FIG. 5, except that the prediction block P is processed in the spatial domain before being subtracted from the original block. As with the frequency domain processing, in the processing block, a number of possible patterns or masks are applied to the prediction block. Example mask or patterns for the processing step are illustrated in FIG. 12 as masks, a, b, c and d. The size of the mask within the block can be varied as appropriate. Also, it will be appreciated that other shapes may be possible, depending on the coding conditions. The masks shown in FIG. 12 should therefore be taken as illustrations only. In FIG. 12, the shaded areas correspond to a first region of the prediction block in which the prediction coefficients are left unchanged. The white, or unshaded areas, correspond to a second region of the prediction block in which the prediction coefficients are substituted or replaced. In this example, the coefficients to be substituted are spatial domain samples corresponding to pixel intensities.

Figure 13:
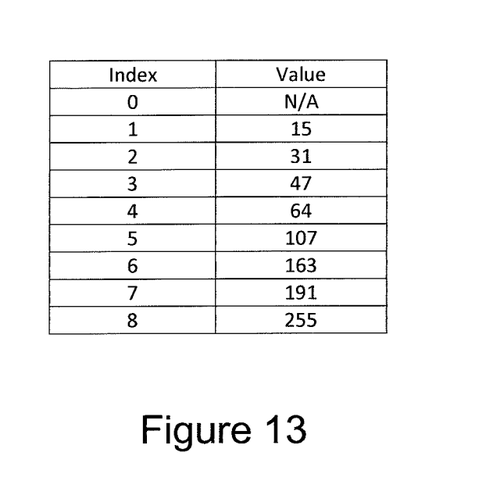
FIG. 13 is an illustration of a look up table used in a coefficient substitution process.
Figure 14:
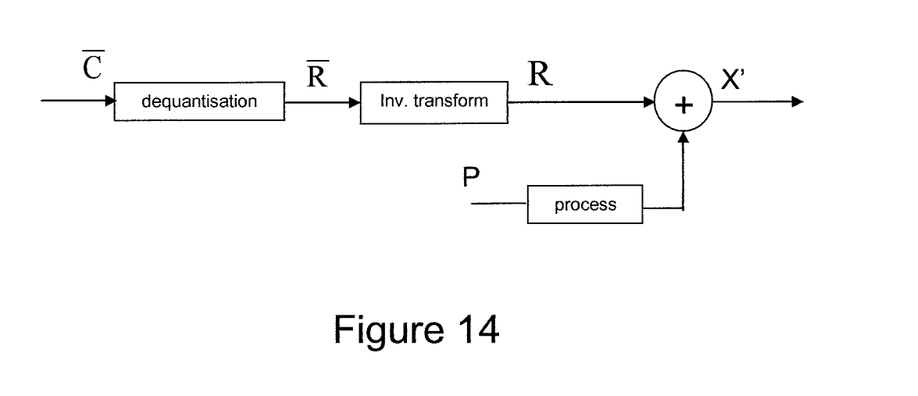
FIG. 14 is a schematic illustration of a modified decoder according to a further example of the invention.

As with the frequency domain case, the modification of the samples in the prediction block can be carried out in a number of different ways, all with the purpose of ensuring that the coding of the resulting residual signal is carried out more efficiently. For example, one way is by using a substitution mechanism similar to the one used in the frequency domain and illustrated in FIG. 10. For example, look-up tables might be used which replace the selected samples in the prediction block with synthetic samples, and associate each of these elements with an index that can be signalled to the decoder side. In this case, the samples in the prediction block are representative of pixel intensities, and the term synthetic samples is used to suggest that the values substituted are scaled to match values in the range of pixel intensities in the prediction block, but are otherwise selected by the modification process. In the same way as for FIG. 10, an example of such a table is illustrated in FIG. 13. The decoding process for the spatial domain is shown in FIG. 14, and is similar to that of FIG. 6 for the frequency domain.

The process of selecting either the pattern and/or the elements in the look-up table would be identical to the one in the frequency domain. An index to identify the pattern and/or an index to identify the element in the look-up table might need to be encoded in the bitstream. Look up tables are not themselves essential but merely provide a convenient way that substitution values may be stored and referred to.

In both of the techniques described above, the coefficients in the second region of the mask that are substituted or replaced, may be substituted or replaced with values that are a combination of the initial prediction coefficient and the predetermined substitution value. For example a weighted combination of the initial prediction value and the predetermined substitution value could be used.

The processing of the prediction block carried out in both the frequency and the spatial domains is generally a separate step carried out after the prediction block has been calculated in the normal way by the encoder or the decoder. In this sense, the prior art encoder and decoder schemes of FIGS. 1 and 2 can be thought of as having a modification processing block situated after the prediction module that receives the formed or generated prediction block and applies the modification process accordingly. This is in fact illustrated in FIGS. 7, 8, 11 and 14. Alternatively, the prediction module itself may be modified to generate a prediction block having the necessary modifications made to improve the efficiency of the encoding. The principle would be the same as described above, with generation of a prediction block having two regions, a first region in which the coefficients are standard coefficients generated from known prediction modes and methods, and a second region in which the coefficients are generated by an algorithm taking into account a value substitution, either substitution in the case of replacement with predetermined values or a combination of values. In embodiments of the invention, the first and second set of predetermined locations are exclusive of one another. In other embodiments, the regions may overlap, such that the substituted values are combinations of predicted values and predetermined values for substitution.

It will be appreciated that the logical blocks or modules or FIGS. 1 and 2, 7, 8, 11 and 14 can be implemented in software and/or in hardware. Furthermore, although there are illustrated as separate blocks, the logical separate functions of the blocks or modules may be combined in single software or hardward modules as appropriate.

The above description is intended to be illustrative in nature, and not to limit the scope of the invention defined by the claims. To the extent that features of the invention are described with respect to separate example embodiments, it will be appreciated that these are contemplated as being combined with the features of other embodiments.

TABLE 1

Binary Shifts in Conventional HEVC for 8 bit data representation

| TU Size | Bin. Shift |
|---|---|
| First DCT stage | |
| 4 × 4 | >>1 |
| 8 × 8 | >>2 |
| 16 × 16 | >>3 |
| 32 × 32 | >>4 |
| Second DCT stage | |
| 4 × 4 | >>8 |
| 8 × 8 | >>9 |
| 16 × 16 | >>10 |
| 32 × 32 | >>11 |

TABLE 2

Selected values of the cross-correlation for blocks of different sizes intra-predicted user planar mode. For 8 × 8 blocks only the DC, AC(0, 2) AC(0, 4), AC(0, 6) AC(2, 0) . . . components are shown. Similarly, for 16 × 16 blocks only the DC, AC (0, 4), AC(0, 8), AC(0, 12), AC(4, 0) . . . components are shown.

| | | | | |
|---|---|---|---|---|
| 4 × 4 | 0.956 | 0.899 | 0.790 | 0.675 |
| | 0.905 | 0.807 | 0.670 | 0.540 |
| | 0.827 | 0.697 | 0.527 | 0.427 |
| | 0.719 | 0.621 | 0.448 | 0.368 |
| 8 × 8 | 0.960 | 0.502 | 0.363 | 0.300 |
| | 0.455 | 0.011 | 0.004 | 0.002 |
| | 0.353 | 0.004 | 0.003 | 0.009 |
| | 0.198 | 0.011 | 0.003 | 0.000 |
| 16 × 16 | 0.949 | 0.374 | 0.280 | 0.318 |
| | 0.415 | 0.002 | 0.010 | 0.007 |
| | 0.177 | 0.002 | 0.017 | 0.008 |
| | 0.097 | 0.004 | 0.001 | 0.000 |

TABLE 3

Selected values of the cross-correlation for 8 × 8 blocks
predicted using different intra-prediction modes. For 8 ×
8 blocks only the DC, AC(0, 2) AC(0, 4), AC(0, 6) AC(2, 0) components
are shown. Similarly, for 16 × 16 blocks only the DC, AC
(0, 4), AC(0,8), AC(0, 12), AC(4, 0) . . . components are shown.

| Mode 7 | 0.963 | 0.037 | 0.026 | 0.020 |
|---|---|---|---|---|
| | 0.681 | 0.153 | 0.109 | 0.081 |
| | 0.503 | 0.202 | 0.105 | 0.092 |
| | 0.088 | 0.207 | 0.072 | 0.005 |
| Mode 10 | 0.969 | 0.351 | 0.234 | 0.129 |
| | 0.939 | 0.301 | 0.252 | 0.182 |
| | 0.860 | 0.201 | 0.187 | 0.183 |
| | 0.856 | 0.182 | 0.192 | 0.200 |
| Mode 26 | 0.952 | 0.755 | 0.514 | 0.571 |
| | 0.372 | 0.341 | 0.225 | 0.199 |
| | 0.342 | 0.278 | 0.169 | 0.210 |
| | 0.348 | 0.219 | 0.178 | 0.153 |

TABLE 4

Patterns At Minimum Distortion According
To Intra-Prediction Mode And TU Size.

| Mode | 8 × 8 | 16 × 16 | 32 × 32 |
|---|---|---|---|
| 0 | tr | tr | tr |
| 1 | sq, L = N/4 | sq, L = N/4 | sq, L = N/4 |
| 2 | sq, L = N/4 | hr, L = N/4 | hr, L = N/4 |
| 3 | sq, L = N/4 | hr, L = N/4 | hr, L = N/4 |
| 4 | sq, L = N/4 | hr, L = N/4 | hr, L = N/4 |
| 5 | hr, L = N/4 | hr, L = N/4 | hr, L = N/4 |
| 6 | hr, L = N/4 | hr, L = N/4 | hr, L = N/4 |
| 7 | hr, L = N/4 | hr, L = N/4 | hr, L = N/4 |
| 8 | hr, L = N/2 | hr, L = N/4 | hr, L = N/4 |
| 9 | hr, L = N/2 | hr, L = N/2 | hr, L = N/4 |
| 10 | vr, L = N/4 | vr, L = N/4 | vr, L = N/4 |
| 11 | vr, L = N/4 | tr | vr L = N/4 |
| 12 | hr, L = N/2 | hr, L = N/4 | hr, L = N/4 |
| 13 | hr, L = N/2 | hr, L = N/4 | hr, L = N/4 |
| 14 | hr, L = N/2 | hr, L = N/4 | hr, L = N/4 |
| 15 | sq, L = N/4 | hr, L = N/4 | hr, L = N/4 |
| 16 | sq, L = N/4 | hr, L = N/4 | hr, L = N/4 |
| 17 | sq, L = N/4 | sq, L = N/4 | hr, L = N/4 |
| 18 | sq, L = N/4 | sq, L = N/4 | sq, L = N/4 |
| 19 | sq, L = N/4 | sq, L = N/4 | sq, L = N/4 |
| 20 | sq, L = N/4 | sq, L = N/4 | sq, L = N/4 |
| 21 | sq, L = N/4 | vr, L = N/4 | vr, L = N/4 |
| 22 | vr, L = N/4 | vr, L = N/4 | vr, L = N/4 |
| 23 | vr, L = N/4 | vr, L = N/4 | vr, L = N/4 |
| 24 | vr, L = N/2 | vr, L = N/4 | vr, L = N/4 |
| 25 | vr, L = N/2 | vr, L = N/4 | vr, L = N/4 |
| 26 | vr, L = N/4 | vr, L = N/4 | vr, L = N/4 |
| 27 | vr, L = N/4 | sq, L = N/4 | tr |
| 28 | vr, L = N/2 | vr, L = N/2 | vr, L = N/4 |
| 29 | vr, L = N/2 | vr, L = N/2 | vr, L = N/4 |
| 30 | vr, L = N/2 | vr, L = N/2 | vr, L = N/4 |
| 31 | sq, L = N/4 | sq, L = N/4 | sq, L = N/4 |
| 32 | sq, L = N/4 | vr, L = N/4 | vr, L = N/4 |
| 33 | sq, L = N/4 | vr, L = N/4 | sq, L = N/4 |

The invention claimed is:

1. A method of decoding video data with compression, the method comprising:
a) receiving an encoded residual signal containing coefficients of a coded region of a picture signal;
b) generating a prediction block containing coefficients of a predicted picture region;
c) forming a modified prediction block by substituting the values of coefficients in the prediction block for other values according to a modification process, the modification process including applying a mask to the prediction block, the mask defining at least a first region of the prediction block where the values of the coefficients are preserved and at least a second region of the prediction block where the values of coefficients are substituted for the other values; and
d) calculating an original picture block containing coefficients of a picture region by adding the residual signal and the modified prediction block to each other.

2. The method of claim 1, comprising:
forming the modified prediction block in the frequency domain; and
calculating the original block in the frequency domain.

3. The method of claim 1, wherein the modification process is selected from a plurality of modification processes.

4. The method of claim 3, wherein the modification process selected from the plurality of modification processes depends on one or more of the shape and/or size of the prediction block, and the prediction encoding scheme used to generate the prediction block.

5. The method of claim 3, wherein the plurality of modification processes includes a plurality of differently shaped masks for application to the prediction block and/or a plurality of different processes for determining said values to be substituted.

6. The method of claim 5, wherein the plurality of processes for determining said values to be substituted each include one or more of:
i) replacing the value of each coefficient in the at least a second region with the constant value zero;
ii) replacing the value of each coefficient in the at least a second region with a predetermined non-zero constant value; and
iii) replacing the value of a plurality of coefficients in the at least a second region with a matrix of constant values.

7. The method of claim 1, comprising:
receiving as a bitstream, the encoded residual signal and an indication indicating a modification processes to modify the prediction block; and
selecting a modification process to form the modified prediction block based on the received indication.

8. A method of encoding video data with compression, the method comprising:
a) receiving an original picture block containing coefficients of a picture region;
b) generating a prediction block containing coefficients of a predicted picture region; and
c) calculating a residual signal for transmission, by subtracting the original picture block and the prediction block from each other,
wherein generating the prediction block further comprises:
b1) generating coefficients at a first set of predetermined locations in the prediction block according to an intra-prediction or inter-prediction coding scheme; and
b2) generating coefficients at a second set of predetermined locations in the prediction block according to a coefficient substitution process, wherein the values of coefficients in the second set of predetermined locations are substituted for other values.

9. The method of claim 8, wherein the coefficient substitution process includes one or more of:
i) setting a coefficient to have a constant value of zero;
ii) setting a coefficient to have a predetermined non-zero constant value; and
iii) setting the value of a plurality of coefficients in the at least a second region to a matrix of constant values.

10. The method of claim 8, wherein the locations in the prediction block that are in the first and second sets of predetermined locations, and/or the coefficient substitution process depend, on one or more of the shape and/or size of the prediction block, and the prediction encoding scheme used to generate the prediction block.

11. The method of claim 8, comprising:
transforming the original picture block and the prediction block into the frequency domain; and
forming the modified prediction block and calculating the residual signal in the frequency domain.

12. The method of claim 8, comprising:
g) calculating the prediction error between the prediction block and the original picture block;
h) generating a second and subsequent prediction block containing coefficients of a predicted picture region, wherein in the generation of the second prediction block, at least one of the coefficient substitution process and/or the locations of the prediction block in the first and second sets of predetermined locations is varied, to generate a plurality of different candidate modified prediction blocks;
i) for each of the plurality of different candidate modified prediction blocks, calculating the prediction error between the respective candidate modified prediction block and the original picture block; and
j) selecting one of the plurality of different candidate modified prediction blocks for use in the calculation of the residual signal based on the prediction error.

13. The method of claim 8, comprising:
setting the coefficients in the second set of predetermined locations from a look up table containing a plurality of candidate values.

14. The method of claim 8, comprising:
k) assigning an index to each of the plurality of different candidate modified prediction blocks and encoding the index as additional bits in the bitstream for transmission;
l) calculating for each of the plurality of different candidate modified prediction blocks candidate a rate distortion cost based on the prediction error and the estimated cost of transmitting the index;
m) in step j, the selection of the prediction block for calculating the residual signal is based on the prediction error and the estimated cost of transmitting the index.

15. A method of decoding video data with compression, the method comprising:
a) receiving an encoded residual signal containing coefficients of a coded region of a picture signal;
b) generating a prediction block containing coefficients of a predicted picture region; and
c) calculating an original picture block containing coefficients of a picture region by adding the residual signal and the prediction block to each other;
wherein generating the prediction block further comprises:
b1) generating coefficients at a first set of predetermined locations in the prediction block according to an intra-prediction or inter-prediction coding scheme; and
b2) generating coefficients at a second set of predetermined locations in the prediction block according to a coefficient substitution process, wherein the values of coefficients in the second set of predetermined locations are substituted for other values.

16. The method of claim 15, wherein the coefficient substitution process includes one or more of:
i) setting a coefficient to have a constant value of zero;
ii) setting a coefficient to have a predetermined non-zero constant value;
iii) setting the value of a plurality of coefficients in the at least a second region to a matrix of constant values.

17. The method of claim 15, wherein the locations in the prediction block that are in the first and second sets of predetermined locations, and/or the coefficient substitution process depend, on one or more of the shape and/or size of the prediction block, and the prediction encoding scheme used to generate the prediction block.

18. The method of claim 15, comprising:
generating the prediction block in the frequency domain and calculating the reconstructed block in the frequency domain.

19. The method of claim 15, comprising:
receiving as a bitstream, the encoded residual signal and an index indicating a modification processes used at the encoder to modify the prediction block; and
selecting one or more of the locations in the prediction block that are in the first and second sets of predetermined locations, and/or the coefficient substitution process based on the received index.

20. The method of claim 15, comprising:
receiving as a bitstream, the encoded residual signal and an index indicating a modification process used at the encoder to modify the prediction block used for encoding; and
setting the coefficients in the second set of predetermined locations based on a look up table containing a plurality of candidate values, wherein elements are extracted from the look up tables based on the received index.

* * * * *